(12) United States Patent
Shaharabany et al.

(10) Patent No.: US 9,747,202 B1
(45) Date of Patent: Aug. 29, 2017

(54) STORAGE MODULE AND METHOD FOR IDENTIFYING HOT AND COLD DATA

(71) Applicants: Amir Shaharabany, Kochav Yair (IL); Alon Marcu, Tel Mond (IL); Hadas Oshinsky, Kfar Saba (IL); Adir Moshe HaCohen, Sunnyvale, CA (US)

(72) Inventors: Amir Shaharabany, Kochav Yair (IL); Alon Marcu, Tel Mond (IL); Hadas Oshinsky, Kfar Saba (IL); Adir Moshe HaCohen, Sunnyvale, CA (US)

(73) Assignee: Sandisk Technologies LLC, Plano, TX (US)

( * ) Notice: Subject to any disclaimer, the term of this patent is extended or adjusted under 35 U.S.C. 154(b) by 725 days.

(21) Appl. No.: 13/829,235

(22) Filed: Mar. 14, 2013

(51) Int. Cl.
*G06F 12/00* (2006.01)
*G06F 12/02* (2006.01)
*G06F 12/123* (2016.01)

(52) U.S. Cl.
CPC ........ *G06F 12/0253* (2013.01); *G06F 12/123* (2013.01)

(58) Field of Classification Search
CPC .............................................. G06F 2212/7211
USPC .......................................................... 711/115
See application file for complete search history.

(56) References Cited

U.S. PATENT DOCUMENTS

| | | | | |
|---|---|---|---|---|
| 2007/0208904 A1* | 9/2007 | Hsieh | ................. | G06F 12/0246 711/103 |
| 2010/0153631 A1* | 6/2010 | Moon | ................. | G06F 12/0246 711/103 |
| 2010/0174845 A1* | 7/2010 | Gorobets | ............ | G06F 12/0246 711/103 |
| 2011/0191521 A1* | 8/2011 | Araki | .................. | G06F 12/0246 711/103 |
| 2012/0179859 A1* | 7/2012 | Kim | .................... | G06F 12/0246 711/103 |
| 2012/0239862 A1* | 9/2012 | Seo | ..................... | G06F 12/0246 711/103 |
| 2012/0246394 A1* | 9/2012 | Ou | ...................... | G06F 12/0246 711/103 |
| 2012/0254513 A1* | 10/2012 | Uehara | ................ | G06F 3/0616 711/103 |
| 2012/0297122 A1 | 11/2012 | Gorobets et al. | | |

(Continued)

OTHER PUBLICATIONS

K. S. Yim, H. Bahn, and K. Koh, "A Flash Compression Layer for Smart Media Card Systems," IEEE Transactions on Consumer Electronics, vol. 50, No. 1, pp. 192-197, Feb. 2004.

(Continued)

*Primary Examiner* — Charles Rones
*Assistant Examiner* — Nanci Wong
(74) *Attorney, Agent, or Firm* — Brinks Gilson & Lione

(57) ABSTRACT

A storage module and method for identifying hot and cold data are provided. The storage module can be removable from a host or can be embedded in a host. In one embodiment, a request to store data in a logical block address (LBA) of a memory of the storage module is received. A physical block associated with the LBA is determined, and it is also determined whether the physical block stores hot or cold data. A last-known open block is then selected, wherein the last-known open block is either hot or cold depending on whether the physical block stores hot or cold data. If space is available in the last-known open block, the data is written to the last-known open block.

27 Claims, 8 Drawing Sheets

(56) References Cited

U.S. PATENT DOCUMENTS

2013/0024609 A1    1/2013  Gorobets et al.
2014/0215129 A1*   7/2014  Kuzmin .............. G06F 12/0246
                                                            711/103

OTHER PUBLICATIONS

Kyuwoon Kim; Sanghyuk Jung; Yong Ho Song, "Compression Ratio Based Hot/Cold Data Identification for Flash Memory," Consumer Electronics (ICCE), 2011 IEEE International Conference on Consumer Electronics, pp. 33-34, Jan. 9-12, 2011.
D. Park; D.H.C. Du, "Hot and Cold Data Identification for Flash Memory Using Multiple Bloom Filters", USENIX conf. on File and Storage Technology, Feb. 2011, 2 pages, www.usenix.org/event/fast11/posters_files/Park_D.pdf.

* cited by examiner

STORAGE MODULE AND METHOD FOR IDENTIFYING HOT AND COLD DATA

BACKGROUND

"Hot" data is data that is likely to change shortly after it has been written to memory, while "cold" data is data that is likely to remain unchanged for a long period of time. Mixing hot and cold data together in the same block of flash memory may cause a garbage collection process to be inefficient. During garbage collection, blocks of flash memory are erased, and the valid data portion of the block is copied to a new block. In a block containing hot data only, a large portion of the block will become obsolete prior to a garbage collection operation requesting an erase of the block. Therefore, only a small amount of data will need to be copied to a new block. A block containing only cold data will most probably stay stable, and garbage collection operations will be applied to such a block at a lower rate than the rate of garbage collection on a hot block. In a block containing both hot and cold data, the hot data will become obsolete while the cold data will still be valid. It will, therefore, suffer from frequent garbage collection operations (like a hot block) but with a large amount of data to be copied to a new block (like a cold block). It is, therefore, advantageous to identify, in advance, the hot and cold data and write them into different physical blocks.

According to some previous approaches to this problem, the host keeps a record of the write commands. Typically, when a host issues a write command, there is a logical address (LBA) associated with the command. The record of write commands would typically include an entry for each LBA, where the record entry will contain information regarding the LBA. The information may include parameters such as a time stamp of the write command, a hit count (counting the number of hits in a given window), and a temperature tag, for example. This information can be used to identify hot/cold LBAs according to a given definition of hot and cold. However, the resolution of LBAs may be very fine (e.g., an LBA may be associated with a data of a 4 Kb size), and the amount of memory required for implementing this approach may be very large and unacceptable.

Other previous approaches categorize data according to its size (i.e., data that is written in small data chunks vs. data that is written in large data chunks). The assumption of this approach is that data that is stable may be already given by the host in large data chunks, while data which is subject to frequent change cannot be aggregated into large data chunks. But, when the decision is made only upon data access size, it is probable that small files often encountered during web browsing could be identified as unstable even though they are not updated frequently.

Another identification method differentiates between cold and hot data by compressing the write data and checking the compression ratio. Considering that multimedia files are already compressed, it would be possible to classify them as cold data after evaluating the compression ratio of write data. In such a method, hot data (e.g. file system metadata) may be effectively compressed, and the cold data (e.g. multimedia data) may not because it is already encoded.

Another previous approach is to combine the compression ratio approach with the data chunk size approach. Large data chunks are considered to be cold data, while for small data chunks, the compression ratio test is used. Data chunks that are already compressed are considered cold, while data chunks with a high compression ratio are considered hot. To avoid high overhead, to measure the compression ratio, the proposed technique compresses only a fraction of data without losing the determination accuracy to a large extent.

In yet another approach, a hot data identification scheme has the following requirements: effective capture of recency as well as frequency, small memory consumption, and low computational overhead. In this approach, a hot data identification scheme based on multiple bloom filters is used. Operation of this approach proceeds by adopting a set of V independent Bloom Filters (BFs) and K independent hash functions. Whenever a write request is issued to the Flash Translation Layer (FTL), the corresponding LBA is hashed by the K hash functions. Then, K hash values set the corresponding K bits in the first BF to 1. When the next write request comes in, the scheme chooses the next BF in a round robin fashion to record its hash values. In addition, it periodically selects one BF in a round-robin manner and erases all information in that BF to reflect a decay effect.

Overview

Embodiments of the present invention are defined by the claims, and nothing in this section should be taken as a limitation on those claims.

By way of introduction, the below embodiments relate to a storage module and method for regulating garbage collection operations based on write activity of a host. The storage module can be removable from a host or can be embedded in a host. In one embodiment, a request to store data in a logical block address (LBA) of a memory of the storage module is received. A physical block associated with the LBA is determined, and it is also determined whether the physical block stores hot or cold data. A last-known open block is then selected, wherein the last-known open block is either hot or cold depending on whether the physical block stores hot or cold data. If space is available in the last-known open block, the data is written to the last-known open block.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned above, various approaches can be used to identify hot and cold data. However, the aforementioned approaches operate in the host, without taking advantage of information that is available at the flash management level of the storage module. The following embodiments provide a method for identifying hot and cold data in flash memory systems using a compact data structure. This method takes advantage of the flash management information to generate a simple data structure that is small in size and is simple to maintain, while providing information on a long history of writes.

Before turning to these and other embodiments, the following section provides a discussion of an exemplary storage module that can be used with these embodiments. Of course, these are just examples, and other suitable types of storage modules can be used.

Figure 1:
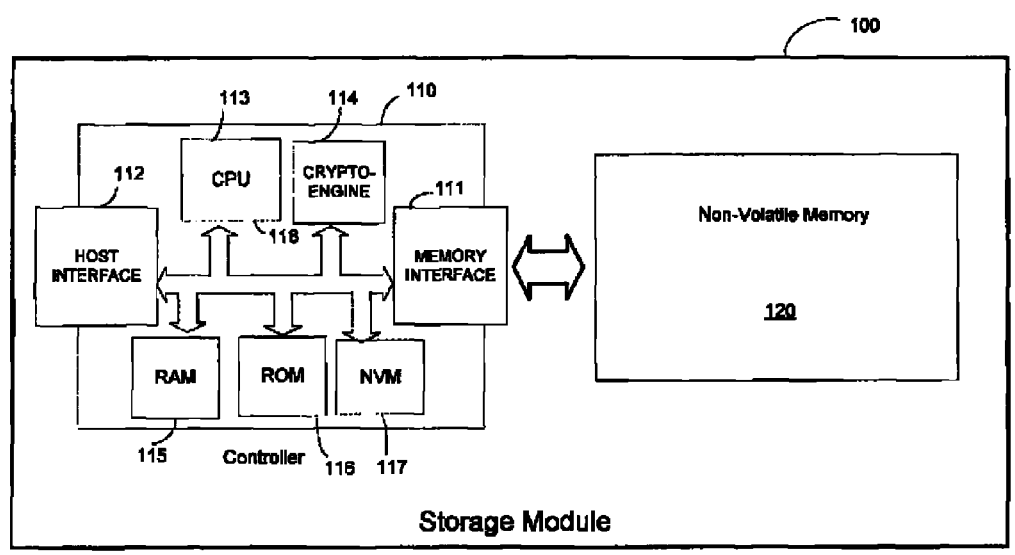
FIG. 1 is a block diagram of an exemplary storage module of an embodiment.

As illustrated in FIG. 1, a storage module 100 of one embodiment comprises a controller 110 and non-volatile memory 120. The controller 110 comprises a memory interface 111 for interfacing with the non-volatile memory 120 and a host interface 112 for placing the storage module 100 operatively in communication with a host. As used herein, the phrase "operatively in communication with" could mean directly in communication with or indirectly in communication with through one or more components, which may or may not be shown or described herein.

Figure 2A:
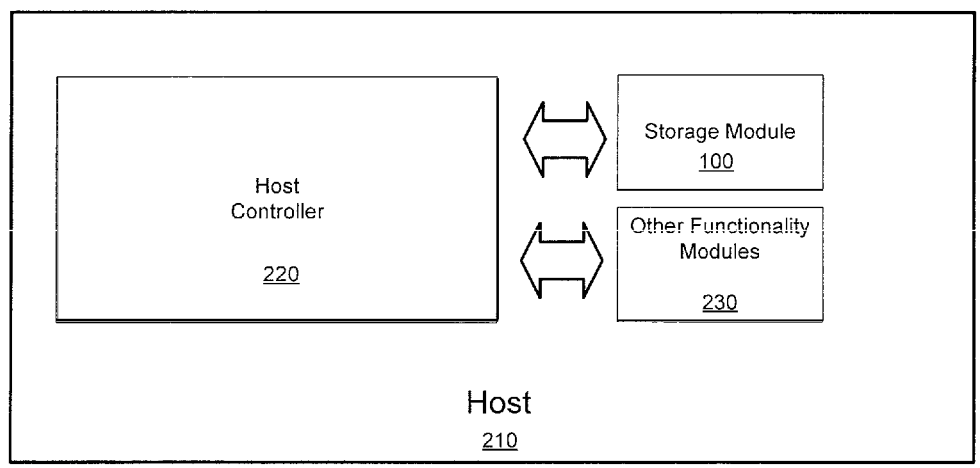
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation. The host controller 220 can interface with the embedded storage module 100 using, for example, an eMMC host interface or a UFS interface. The host 210 can take any form, such as, but not limited to, a solid state drive (SSD), a hybrid storage device (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing.

Figure 2B:
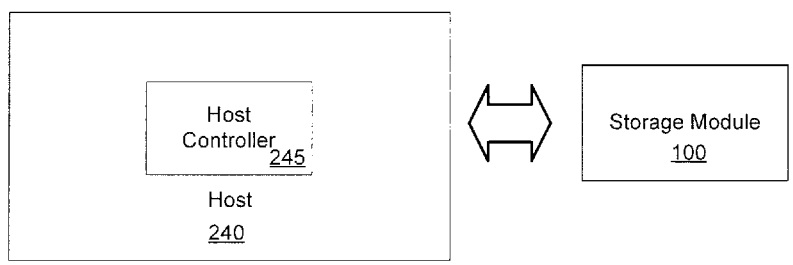
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the controller 110, and also conveys memory responses from the controller 110 to the host controller 220 (FIG. 2A) or host 240 (FIG. 2B). Also, it should be noted that when the storage module 110 is embedded in the host 210, some or all of the functions described herein as being performed by the controller 110 in the storage module 100 can instead be performed by the host controller 220.

Returning to FIG. 1, the controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from Marvell or SandForce.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed.

Figure 3:
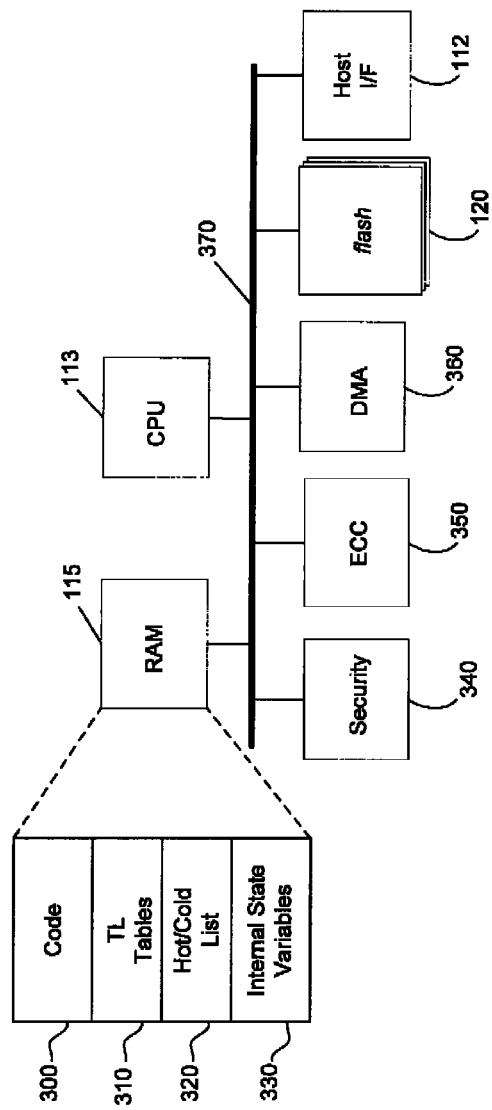
FIG. 3 is a block diagram of another version of an exemplary storage module of an embodiment.

Turning again to the drawings, FIG. 3 is another illustration of the storage module 100. As in FIG. 1, this illustration shows that the storage module 100 contains a CPU 113, RAM 115, non-volatile memory 120, and a host interface 112. Additionally, this figure shows that the RAM 115 can store code 300 executable by the CPU 113 to configure the CPU 113 to operate as described herein, a management translation layer (e.g., a logical-to-physical address table/map) 310, a hot/cold list 330, and internal state variables 330 used in the operation of the storage module 100. The storage module 100 can also contain security, error correction code (ECC), and direct memory access (DMA) modules 340, 350, 360 connected to the other components by a bus 370.

With exemplary configurations of the storage module 100 now described, the following section discusses various embodiments that can be used for identifying hot and cold data.

As mentioned above, various approaches can be used to identify hot and cold data. However, all of those approaches operate in the host, without taking advantage of information that is available at the flash management level of the storage module 100. The following embodiments provide a method for identifying hot and cold data in flash memory systems using a compact data structure. This method takes advantage of the flash management information to generate a simple data structure (the hot/cold list 330) that is small in size and is simple to maintain, while providing information on a long history of writes. In general, these embodiments separate the hot data from the cold data prior to writing the data into the flash memory array 120. This allows for a more efficient garbage collection process, as physical blocks may be dedicated to hot data and cold data separately, and the garbage collection process can be done separately for hot data and cold data.

These embodiments use the criterion of "recency" for defining the temperature of data (or of an logical block address (LBA)) and take advantage of the fact that the "recency" of any LBA is similar to the "recency" of the physical block into which the LBA was written. Therefore, tracking the recency of the physical blocks may suffice for determining the temperature of data. The physical blocks are much larger than the LBAs (e.g., 2 Mb vs. 4 Kb); therefore, a small memory suffices for keeping track of the temperature. The information regarding the history of the physical blocks into which the LBA was written is unknown at the host level. However, the information is known to the storage module 100 of this embodiment because the storage module 100 has a management mechanism for managing a record of physical blocks according to the order in which they were written to by the host. The record may be in the form of a list (e.g., the hot/cold list 320) in which block indices are stored according to the order the blocks were opened for writing.

In general, when the host issues a write command to write certain data, the host will specify an LBA to write the data into. The memory module 100 determines a physical address and associates the physical address with the LBA. If the block containing the physical address is not currently open for writing, the block is opened, and the block number is added to the head of the list. If the physical block is already open for writing, no operation need to be applied to the list of physical blocks. The step of determining the physical address (mentioned above) may be a function of the "temperature" of the LBA. This process of identifying hot and cold data will be discussed in more detail in conjunction with the flowchart 400 of FIG. 4.

Figure 4:
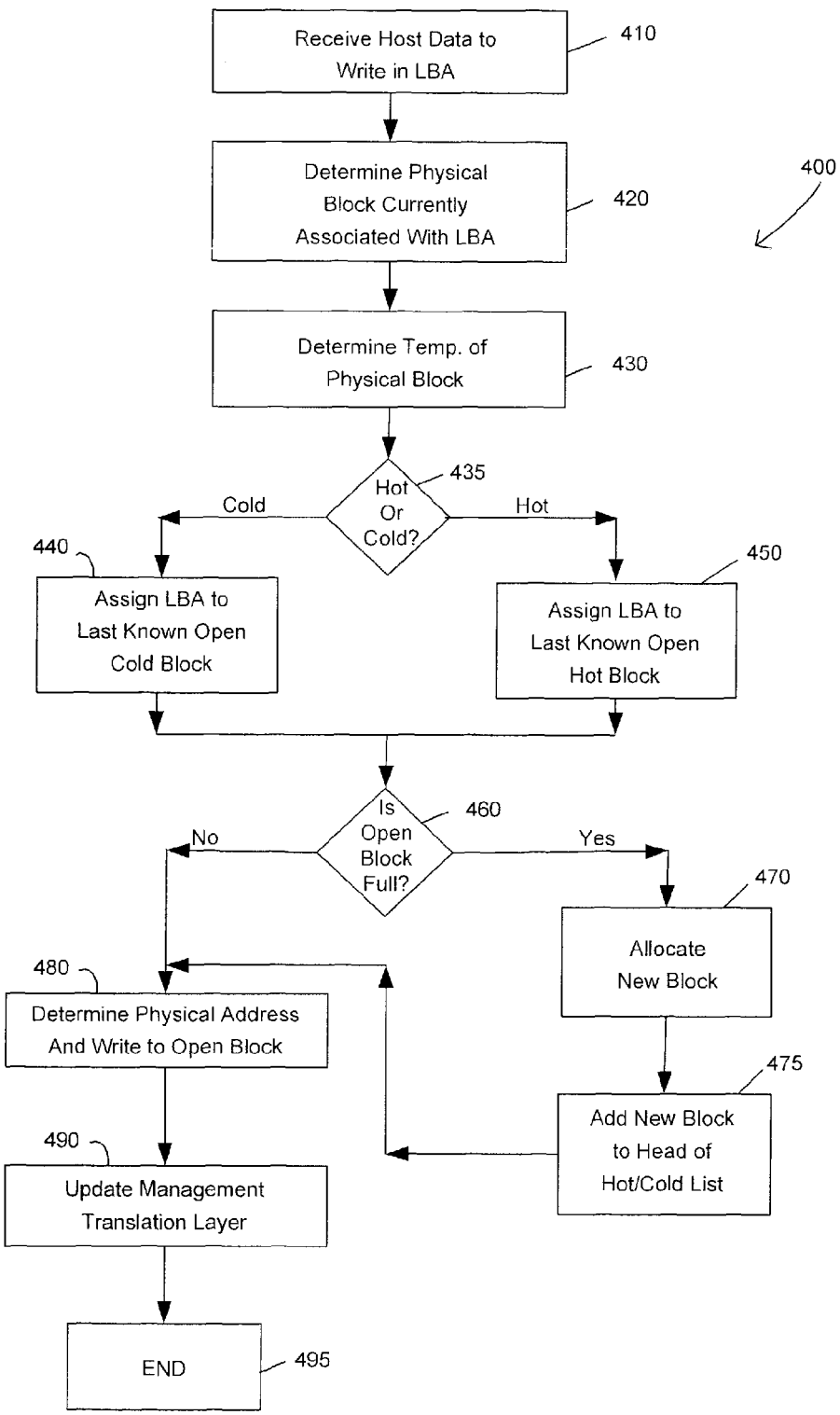
FIG. 4 is a flow chart of a method of an embodiment for identifying hot and cold data.

As shown in FIG. 4, the storage module 100 received data from the host to write to a logical block address (LBA) of the memory 120 (act 410). Next, the storage module 100 determines the physical block currently associated with the LBA (act 420). This is done by the management translation layer of the storage module 100, which contains a logical-to-physical addresses table or map. The storage module 100 then determines the temperature of the physical block (acts 430, 435). In this embodiment, the storage module 100 stores (e.g., in RAM 115) a list of the X (100, for example) most-recently open physical blocks (sometimes referred to hereinafter as the "hot/cold list" or the "host write block queue"). To determine the temperature of a physical block, the storage module 100 can look for the appearance of that physical block on the list. If the block does not appear in the list, it is a cold. If the block is at the head of the list, it is hot. If the block is on the list but not at the top, the block is either hot or cold depending on a threshold set in the storage module 100 (e.g., in a 100 block list, blocks 1-30 can be hot while blocks 31-100 can be cold). If no physical block is associated with the LBA in act 420, by definition, the block would be cold.

If the temperature of the physical block is cold, the storage module 100 assigns an LBA to the last-known open cold block (act 440). On the other hand, if the temperature of the physical block is hot, the storage module 100 assigns an LBA to the last-known open hot block (act 450). It should be noted that even though a block appears on the most-recently-open-physical-blocks list, it does not necessarily mean that the block is still open when the list is consulted, as the block could have been closed after being added to the list. However, an updatable flag can be used to indicate which of the blocks on the list are open or closed. So, to find the last-known open hot or cold block, the storage device 100 does not necessarily select the first hot or cold block on the list but rather selects the first hot or cold block on the list that is indicated to still be open.

Next, the storage module 100 determines if the (hot or cold) open block is full (act 460). If the open block is full, the storage module 100 allocates a new block (act 470) and adds the new block to the head of the hot/cold list (act 475). Then, the storage device 100 determines the physical address of the new block and writes the data to it (act 480). The storage module 100 can then update the management translation layer (act 490). That is, if the LBA is no longer associated with the previous physical block, the management translation layer needs to be updated to reflect the current block. The process then ends (act 495).

To summarize, in this embodiment, the memory module 100 uses the LBA to find the physical block that is currently associated with that LBA, (i.e., the physical block that stores the data that was previously assigned to that LBA). Then, the memory module 100 checks the age of the block by the placement of the block in the list (or, alternatively, by looking at the time stamp assigned to the physical block). If this is the first reference to the specific LBA, then no physical block would previously be associated with it, and the time stamp associated with it may be a predefined value or not defined at all. Note that in this example, the temperature of an LBA is the same as the temperature of the physical block where the LBA was previously written. The temperature (or age) of the LBA can then be determined by the memory module 100 (e.g. by comparing the present time with the time associated with the physical block). If the LBA is determined to be cold (e.g., by comparing the temperature of the LBA with a predefined temperature threshold), the new host data that is to be written to the LBA may be designated as cold data and may be routed to a physical block assigned for storing cold data. If the LBA is determined to be hot, the data may be designated as hot data and may be routed to a physical block assigned for storing hot data. According to another approach, hot data may be routed to a single-level cell (SLC) portion of the flash memory 120, while cold data is routed to a multi-level cell (MLC) portion of the flash memory 120.

These embodiments provide a very simple and low-complexity solution for identifying hot/cold data in flash memories using the following principles: (1) maintain a (small) list of recently-written physical blocks, (2) keep the list small and manage only blocks (and not smaller units of write entities, such as pages or sectors), (3) insert a block into the list only when the block is opened for a host write (and not upon every write command into the block), and (4) determine the temperature of an LBA by finding the physical block into which the LBA was last written. This simple and low-complexity solution is realized because flash memories are written in blocks, wherein, at any given time, only a limited amount of blocks (e.g., fewer than 10) are open for writing. Each block may contain a large amount of data. Therefore, a short list containing only a limited number of blocks may give visibility to a long history of writes. For example, if each block contains 2 MB and writing is done in resolution of 4 KB, then a list of 1,000 physical blocks gives visibility into the last 2 GB of writing commands, which amount to 500 write commands.

Figure 5:
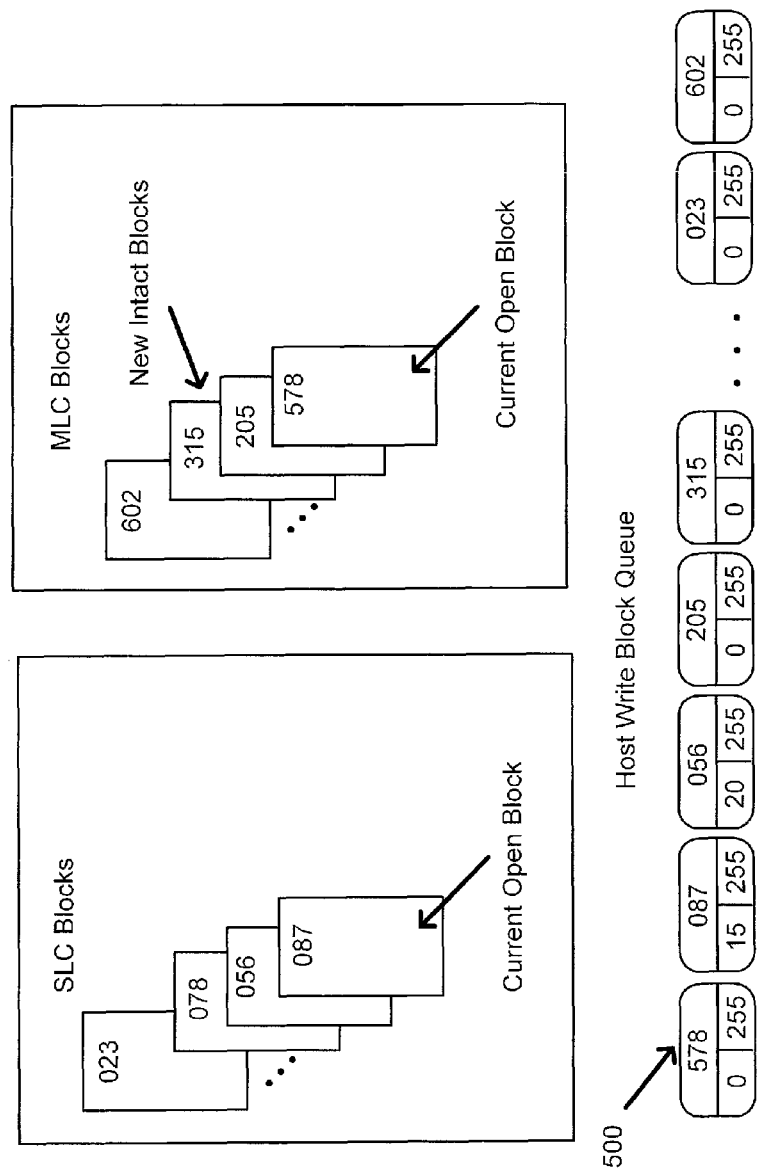
FIG. 5 is an illustration of a hot/cold list of an embodiment.

In another embodiment, the age of a block may be measured in terms of the amount of data (e.g., MBs) written to the memory 120. According to this embodiment, the memory module 100 can keep track of host-written data in block resolution. The list of host write blocks (HWB) (i.e., the hot/cold list) reflects the order the host wrote the data. Each entry contains the physical block number and offsets start/end. For any LBA, the tracking can indicate when it was previously written. This is illustrated in FIG. 5 FIG. 5 shows a host write block (HWB) queue 500 (i.e., the hot/cold list), where block 578 is at the head of the list (block 578 is the hottest block) and block 602 is at the end of the list (block 602 is the coldest block). This list 500 also shows the amount of written data in each block. For example, the list 500 shows that block 578 is fully written because all of the 256 pages of the block have been written to (as designated by the 0 and 255 notation). On the other hand, Block 87 was previously the host open block starting from page 15, pages 0-14 most likely was written by garbage collection operation, and other entry of block 87 offset 0-14 may be observed in a colder area of the list. Above the list 500, FIG. 5 shows, diagrammatically, the current open blocks in both the SLC block set and the MLC block set. (In this example, the storage module 100 has both SLC and MLC blocks. In other examples, the storage module 100 can have only a single memory type.)

While the block at the head of the list 500 is the hottest and the block at the end of the list 500 is the coldest, as mentioned above, there is a threshold for determining which of the other blocks on the list are hot or cold. This threshold for distinguishing hot data from cold data can be predefined and static. For example, the threshold can be a valid data percentage (e.g., 10%). In practice, the amount of valid data may differ from the threshold. If the amount of valid data is significantly larger than the 10% threshold in this example (e.g., larger than 15%), this may indicate that too much data was designated as hot, and the temperature threshold may need to be lowered (such that only very young data would be declared hot). On the other hand, if the amount of valid data is significantly lower than the 10% threshold in this example (e.g., lower than 5%), this may indicate that not enough data was designated as hot, and the temperature threshold may need to be raised higher. Alternatively, the threshold can dynamic to adapt automatically to changing conditions or different system configurations. For example, the threshold can be set differently on a multi-die system versus on a single die system.

Figure 6:
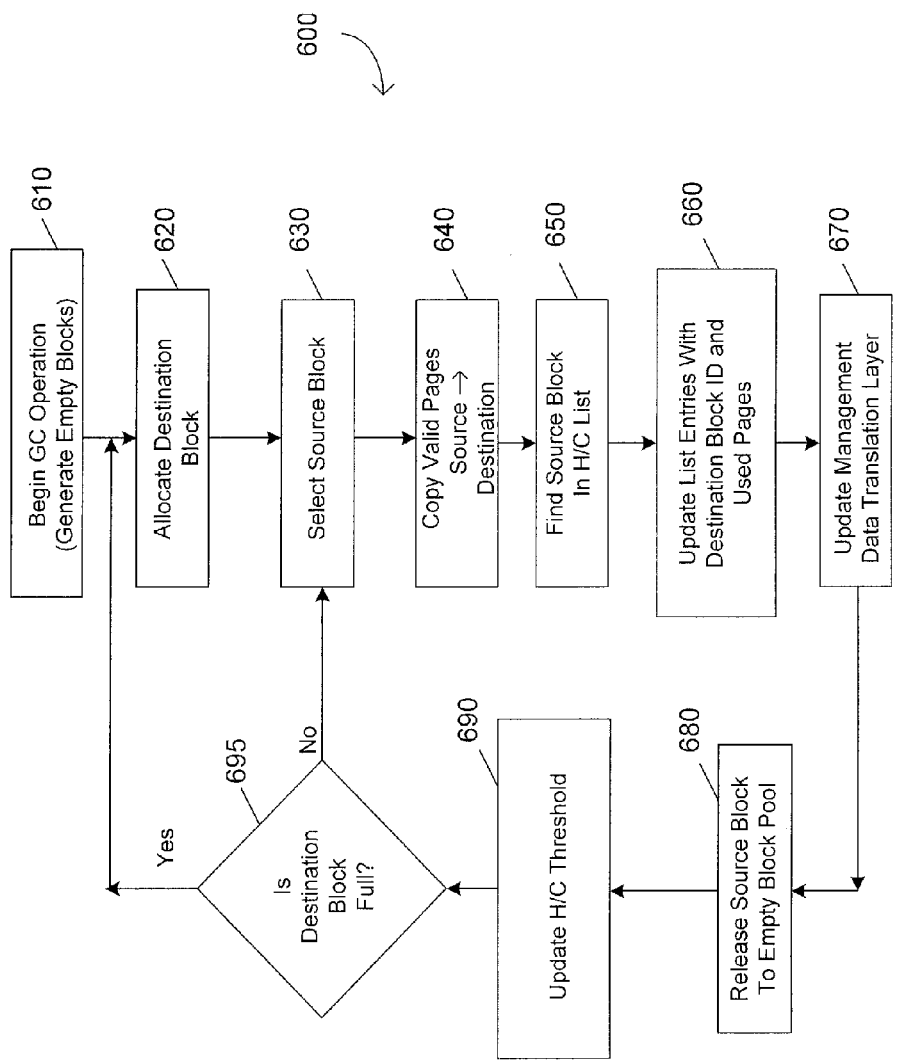
FIG. 6 is a flow chart of a method of an embodiment for maintaining hot/cold information during garbage collection.

Returning to the drawings, FIG. 6 is a flow chart of a method for the maintenance of hot/cold information during garbage collection. Garbage collection compacts a block when the amount of valid data in the block is low due to parts of the data becoming obsolete. In this case, the valid data is written to a new block, and the compacted block is erased. In such a case, parts of the new block are entered in the list of physical blocks with the age of the compacted block (e.g., by replacing the compacted block) and parts of the new block (e.g., parts that are still not written) may be entered at the head of the list of physical blocks where the age associated with the unwritten part of the block is the youngest (hottest) of all blocks.

As shown in FIG. 6, the storage module 100 begins a garbage collection operation to generate empty blocks (act 610). First, the storage module 100 allocates a destination block with free space (act 620). Then, the storage module 100 selects a source block (act 630). This can be done by looking for the blocks with the least amount of valid information (e.g., as tracked by a counter). The storage module 100 then copies the valid pages from the source block to the destination block (act 640). Next, the storage module 100 finds the source block in the hot/cold list (act 650). The storage module 100 then updates the entries in the list with the destination block ID and the used pages (act 660). The storage module 100 also updates the management data in the translation layer (act 670). Next, the storage module 100 releases the source block to the empty block pool (act 680). Optionally, the storage module 100 can the update the hot/cold threshold, as mentioned above (act 590). Finally, the storage module 100 determines if the destination block is full (act 695). If it is, another destination block is allocated (act 520); otherwise, another source block is selected (act 630).

Figure 7:
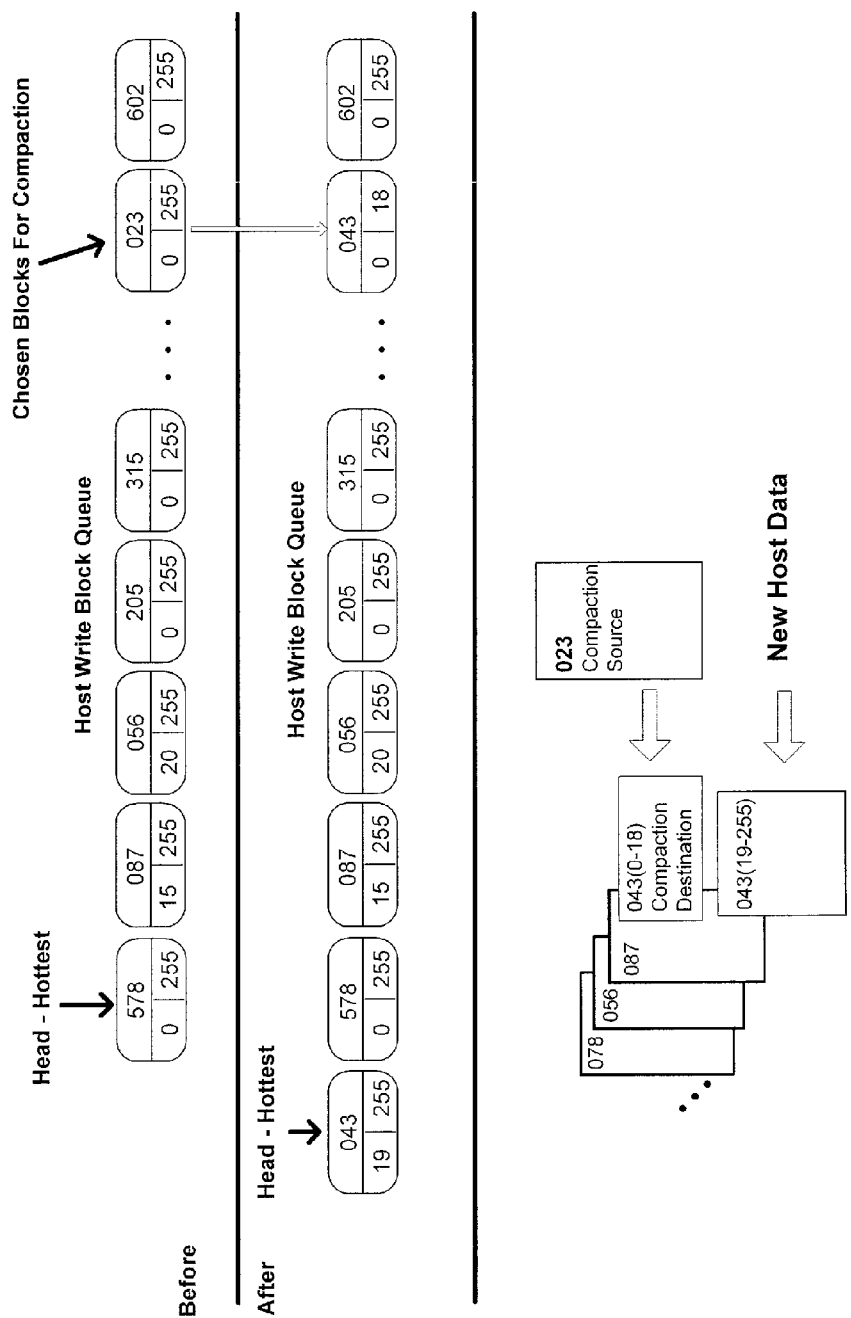
FIG. 7 is an illustration of a hot/cold list of an embodiment before and after garbage collection.

An example of this method will now be illustrated in conjunction with FIG. 7. FIG. 7 shows versions of the hot/cold list before and after garbage collection. Before garbage collection, block 23 is chosen for compaction. Block 23 is the second coldest block and is fully written (from block 0-255). In this example, most of the pages in block 23 are invalid (as indicated by flags in the list or by some other notation), as there are only 19 pages of valid data. During garbage collection, all of the valid pages of data from block 23 are copied to a fresh block 43. Block 23 is then erased and is available for future use.

As shown in the "after" version of the list, after garbage collection, block 43 is designated in the list as storing pages 0-18, which are the 19 pages of data moved from block 23. Since the data in block 43, pages 0-18 is the same data that was in block 23, block 43, pages 0-18 has the same position in the list as block 23. That is, the garbage collection process did not change the temperature of the data. However, as only pages 0-18 in block 43 are occupied with data, pages 19-255 are available to be written into. So, block 43, pages 19-255 are move to the head of the list 710, so they will be the first to be written in with host data. This is shown diagrammatically on the bottom of FIG. 7, with the source data going into pages 0-18 of block 43 but with new host data going into pages 19-255 of block 43. Accordingly, in this embodiment, there are two temperatures of a given block.

Figure 8:
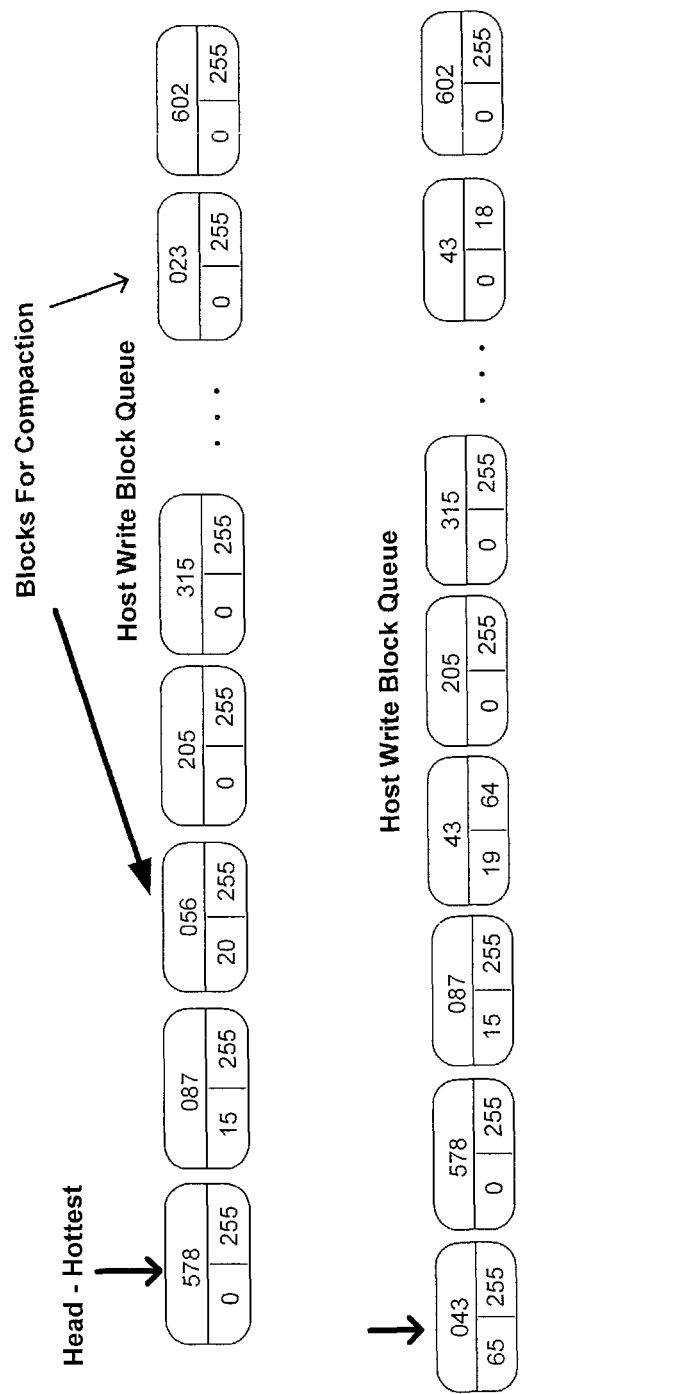
FIG. 8 is another illustration of a hot/cold list of an embodiment before and after garbage collection.

A garbage collection operation can be performed that merges two blocks (with different temperatures) and writes the valid data from each of the blocks into a new block. In this case, the new block will hold data associated with different ages. The list of physical blocks can be updated such that part of the new block will replace one of the old blocks, and its associated age will be the age of the replaced block. Part of the new block will replace the second of the old blocks, and its associated age will be the age of the replaced second block. One option for achieving this is by recording the start/end offsets together with the block number. This option is illustrated in FIG. 8, where blocks 56 and 23 are merged together to block 43. Again, the pages in block 43 copied from blocks 56 and 23 are still designated with their temperatures after the garbage collection operations, and the open pages of block 43 are at the head of the list.

There are several advantages associate with these embodiments. For example, identifying hot and cold data according to these embodiments is simpler than prior implementations, which determine the temperature of an LBA based only on monitoring the logical addresses. Taking advantage of the information at the storage module level (i.e. the physical block addresses) enables tracking the temperature of LBAs by keeping a small record of recent physical addresses, without the need to track the temperature of each LBA individually. Also, reducing the amount of garbage collection, as described in these embodiments, increases performance and system responsiveness and creates a better user experience. It also increases the endurance of the system, resulting in a longer product life time.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for identifying hot and cold data, the method comprising:
    performing the following in a storage module which is operatively in communication with a host:
        receiving a request from the host to store data in a logical block address (LBA) of a memory of the storage module;
        determining a first physical block associated with the LBA based on a logical-to-physical address map;
        determining how recently the first physical block was last written to;
        determining whether the LBA is hot or cold based on how recently the first physical block was last written to, wherein a size of the first physical block is larger than a size of the LBA;
        in response to determining that the LBA is hot, storing the data in a second physical block, wherein the second physical block is designated for hot data; and
        in response to determining that the LBA is cold, storing the data in a third physical block, wherein the third physical block is designated for cold data;
        wherein, irrespective of whether the LBA is determined to be hot or cold, the data is stored in a different physical block than the one determined using the logical-to-physical address map.

2. The method of claim 1 further comprising:
    selecting a last-known open block, wherein the last-known open block is either hot or cold depending on whether the first physical block stores hot or cold data;
    if space is available in the last-known open block, writing the data from the host to the last-known open block; and
    if space is not available in the last-known open block, writing the data from the host to a newly-allocated block.

3. The method of claim 1, wherein the memory module determines how recently the first physical block was last written to by analyzing a list of most-recently open blocks.

4. The method of claim 3, wherein a threshold for determining which blocks on the list are hot or cold is static.

5. The method of claim 3, wherein a threshold for determining which blocks on the list are hot or cold is dynamic.

6. The method of claim 1 further comprising updating the logical-to-physical address map to associate the LBA with the second or third physical block, as appropriate.

7. The method of claim 1 further comprising performing garbage collection on the blocks in the memory while maintain a temperature of data being compacted.

8. The method of claim 7 further comprising, during garbage collection, placing a block with available pages at a beginning of a list.

9. A storage module comprising:
    a memory; and
    a processor in communication with the memory, wherein the processor is configured to:
        receive a request from the host to store data in a logical block address (LBA) of the memory;
        determine a first physical block associated with the LBA based on a logical-to-physical address map;
        determine how recently the first physical block was last written to;
        determine whether the LBA is hot or cold based on how recently the first physical block was last written to, wherein a size of the first physical block is larger than a size of the LBA;
        in response to determining that the LBA is hot, store the data in a second physical block, wherein the second physical block is designated for hot data; and
        in response to determining that the LBA is cold, store the data in a third physical block, wherein the third physical block is designated for cold data;
        wherein, irrespective of whether the LBA is determined to be hot or cold, the data is stored in a different physical block than the one determined using the logical-to-physical address map.

10. The storage module of claim 9, wherein the processor is further configured to:
    select a last-known open block, wherein the last-known open block is either hot or cold depending on whether the first physical block stores hot or cold data;
    if space is available in the last-known open block, write the data from the host to the last-known open block; and
    if space is not available in the last-known open block, write the data from the host to a newly-allocated block.

11. The storage module of claim 9, wherein the memory module determines how recently the first physical block was last written to by analyzing a list of most-recently open blocks.

12. The storage module of claim 11, wherein a threshold for determining which blocks on the list are hot or cold is static.

13. The storage module of claim 11, wherein a threshold for determining which blocks on the list are hot or cold is dynamic.

14. The storage module of claim 9, wherein the processor is further configured to update the logical-to-physical address map to associate the LBA with the second or third physical block, as appropriate.

15. The storage module of claim 9, wherein the processor is further configured to perform garbage collection on the blocks in the memory while maintain a temperature of data being compacted.

16. The storage module of claim 15, wherein the processor is further configured to, during garbage collection, place a block with available pages at a beginning of a list.

17. A method for identifying hot and cold data, the method comprising:
    performing the following in a host having embedded therein a host controller and a storage module:
        receiving a request to store data in a logical block address (LBA) of a memory of the storage module;
        determining a first physical block associated with the LBA based on a logical-to-physical address map;
        determining how recently the first physical block was last written to;

determining whether the LBA is hot or cold based on how recently the first physical block was last written to, wherein a size of the first physical block is larger than a size of the LBA;

in response to determining that the LBA is hot, storing the data in a second physical block, wherein the second physical block is designated for hot data; and in response to determining that the LBA is cold, storing the data in a third physical block, wherein the third physical block is designated for cold data;

wherein, irrespective of whether the LBA is determined to be hot or cold, the data is stored in a different physical block than the one determined using the logical-to-physical address map.

18. The method of claim 17 further comprising:

selecting a last-known open block, wherein the last-known open block is either hot or cold depending on whether the first physical block stores hot or cold data;

if space is available in the last-known open block, writing the data from the host to the last-known open block; and if space is not available in the last-known open block, writing the data to a newly-allocated block.

19. The method of claim 17, wherein determining how recently the first physical block was last written to is performed by analyzing a list of most-recently open blocks.

20. The method of claim 19, wherein a threshold for determining which blocks on the list are hot or cold is static.

21. The method of claim 19, wherein a threshold for determining which blocks on the list are hot or cold is dynamic.

22. The method of claim 17 further comprising updating the logical-to-physical address map to associate the last-known open block with the LBA.

23. The method of claim 17 further comprising performing garbage collection on the blocks in the memory while maintain a temperature of data being compacted.

24. The method of claim 23 further comprising, during garbage collection, placing a block with available pages at a beginning of a list.

25. The method of claim 17, wherein at least some of the acts are performed by a controller in the storage module.

26. The method of claim 17, wherein at least some of the acts are performed by the host controller.

27. A storage system comprising:

a memory;

means for receiving a request from a host to store data in a logical block address (LBA) of the memory;

means for determining a first physical block associated with the LBA based on a logical-to-physical address map;

means for determining how recently the first physical block was last written to;

means for determining whether the LBA is hot or cold based on how recently the first physical block was last written to, wherein a size of the first physical block is larger than a size of the LBA;

means for, in response to determining that the LBA is hot, storing the data in a second physical block, wherein the second physical block is designated for hot data; and means for, in response to determining that the LBA is cold, storing the data in a third physical block, wherein the third physical block is designated for cold data;

wherein, irrespective of whether the LBA is determined to be hot or cold, the data is stored in a different physical block than the one determined using the logical-to-physical address map.

* * * * *